(12) United States Patent
Kaewell, Jr. et al.

(10) Patent No.: US 7,106,819 B1
(45) Date of Patent: Sep. 12, 2006

(54) PLURAL SUBSCRIBER SYSTEM UTILIZING SYNCHRONIZED TIMESLOTS ON A SINGLE FREQUENCY

(75) Inventors: John David Kaewell, Jr., Philadelphia, PA (US); Scott David Kurtz, Mount Laurel, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 09/356,845

(22) Filed: Jul. 19, 1999

Related U.S. Application Data (63) Continuation of application No. 08/796,973, filed on Feb. 7, 1997, now Pat. No. 5,930,297, which is a continuation of application No. 08/588,073, filed on Jan. 17, 1996, now Pat. No. 5,625,653, which is a continuation of application No. 08/347,835, filed on Dec. 1, 1994, now Pat. No. 5,495,508, which is a continuation of application No. 08/104,322, filed on Aug. 9, 1993, now abandoned, which is a continuation of application No. 07/438,618, filed on Nov. 20, 1989, now abandoned, which is a continuation of application No. 07/123,395, filed on Nov. 20, 1987, now Pat. No. 4,935,927.

(51) Int. Cl.
*H04L 7/00* (2006.01)
*H04B 17/02* (2006.01)
*H04B 7/19* (2006.01)
*H04B 7/14* (2006.01)

(52) U.S. Cl. .................. 375/356; 375/211; 455/13.2; 370/274

(58) Field of Classification Search .............. 375/356, 375/364, 368, 111; 370/347, 509, 513, 322, 370/324, 315; 455/7, 24
See application file for complete search history.

(56) References Cited

U.S. PATENT DOCUMENTS

| | | | | |
|---|---|---|---|---|
| 3,230,458 | A | | 1/1966 | Strangeland ............ 325/410 |
| 3,593,138 | A | * | 7/1971 | Dunn .................. 375/285 |
| 3,879,581 | A | * | 4/1975 | Schlosser et al. ........ 370/324 |
| 4,001,691 | A | * | 1/1977 | Guenberg ............. 375/214 |
| 4,031,330 | A | * | 6/1977 | Van Leeuwen .......... 375/368 |
| 4,071,711 | A | | 1/1978 | Beaufore et al. ........ 320/95.2 |
| 4,251,865 | A | | 2/1981 | Moore et al. ........... 370/95.2 |
| 4,253,188 | A | | 2/1981 | Gable ................. 375/110 |
| 4,397,019 | A | | 8/1983 | Alvarez et al. ......... 370/104.1 |
| 4,414,661 | A | | 11/1983 | Karlstrom ............. 370/95 |
| 4,470,141 | A | | 9/1984 | Takada ............... 455/51.1 |
| 4,510,595 | A | | 4/1985 | Glance et al. .......... 370/32 |
| 4,513,416 | A | * | 4/1985 | Fajiwara .............. 370/324 |
| 4,549,293 | A | * | 10/1985 | Christian et al. ........ 455/517 |
| 4,577,315 | A | * | 3/1986 | Otsuka ............... 455/343 |
| 4,630,314 | A | | 12/1986 | Smith ................ 455/52 |

(Continued)

FOREIGN PATENT DOCUMENTS

DE     3118018     11/1982

(Continued)

*Primary Examiner*—Tesfaldet Bocure
(74) *Attorney, Agent, or Firm*—Volpe and Koenig, P.C.

(57) ABSTRACT

A wireless digital telephone system containing at least one emulated base station plus one or more subscriber stations, the emulated base station comprising a station similar to the subscriber station but having the capability of initiating a synchronization process whereby it is enabled to assign time slots to the subscriber station within the frame pattern of an amplitude signal by means of monitoring for positive edges in the signal.

19 Claims, 6 Drawing Sheets

U.S. PATENT DOCUMENTS

| | | | |
|---|---|---|---|
| 4,637,036 A | 1/1987 | Kobari | 375/76 |
| 4,639,914 A | 1/1987 | Winters | 455/54.1 |
| 4,644,534 A * | 2/1987 | Sperlich | 370/347 |
| 4,656,653 A | 4/1987 | Oda et al. | 379/61 |
| 4,675,863 A | 6/1987 | Paneth et al. | 370/50 |
| 4,713,809 A * | 12/1987 | Mizota | 370/347 |
| 4,742,514 A * | 5/1988 | Goode et al. | 370/327 |
| 4,754,450 A | 6/1988 | Lynk, Jr. et al. | 370/29 |
| 4,779,262 A | 10/1988 | Avis et al. | |
| 4,785,450 A * | 11/1988 | Bolgiano et al. | 370/329 |
| 4,785,680 A | 11/1988 | Bolgiano et al. | 455/34 X |
| 4,788,681 A | 11/1988 | Thomas et al. | 370/100 |
| 4,794,649 A * | 12/1988 | Fujiwara | 455/9 |
| 4,811,420 A | 3/1989 | Avis et al. | 455/51 |
| 4,817,089 A | 3/1989 | Paneth et al. | 370/95 |
| 4,825,448 A | 4/1989 | Critchlow | 375/8 |
| 4,882,770 A | 11/1989 | Miyahira et al. | 455/603 |
| 4,974,099 A | 11/1990 | Lin et al. | 375/122 |
| 5,121,391 A | 6/1992 | Paneth et al. | |
| 5,134,710 A | 7/1992 | Akerberg | |
| 5,258,981 A | 11/1993 | Davey et al. | |
| 5,657,323 A | 8/1997 | Jan et al. | |

FOREIGN PATENT DOCUMENTS

| | | | |
|---|---|---|---|
| DE | 3423640 | | 6/1984 |
| DE | 3423780 | | 6/1984 |
| EP | 0077216 | | 4/1983 |
| EP | 0100593 | | 2/1984 |
| EP | 0156765 | | 2/1985 |
| EP | A2-0-210-811 | * | 4/1987 |
| EP | 0312690 | | 5/1988 |
| EP | 0347396 | | 12/1989 |
| FR | 2599202 | | 5/1986 |
| GB | 1506710 | | 4/1978 |
| GB | 2095516 | | 3/1982 |
| JP | 01174023 A | | 7/1989 |
| JP | 01232838 A | | 9/1989 |
| WO | 8400455 | | 2/1984 |
| WO | 8606915 | | 11/1986 |

* cited by examiner

PLURAL SUBSCRIBER SYSTEM UTILIZING SYNCHRONIZED TIMESLOTS ON A SINGLE FREQUENCY

CROSS REFERENCE TO RELATED APPLICATIONS

This application is a continuation of application Ser. No. 08/796,973, filed on Feb. 7, 1997 now U.S. Pat. No. 5,930,297, which is a continuation of application Ser. No. 08/588,073, filed on Jan. 17, 1996, now U.S. Pat. No. 5,625,653, which is a continuation of application Ser. No. 08/347,835, filed on Dec. 1, 1994, now U.S. Pat. No. 5,495,508, which is a continuation of application Ser. No. 08/104,322, filed Aug. 9, 1993 now abandoned, which is a continuation of application Ser. No. 07/438,618, filed Nov. 20, 1989, now Abandoned, which is a continuation of application Ser. No. 07/123,395, filed Nov. 20, 1987, now U.S. Pat. No. 4,935,927.

BACKGROUND OF THE INVENTION

In general, present day telephone systems are increasingly using wireless technology for long distance calls and, in some instances, have begun the use of digital technology; however, no system in general use today has been capable of providing effective and efficient wireless digital technology for local calls to and from individual subscribers. Such technology has been disclosed in various recent patents commonly owned by the present applicants' assignee, as, for example, in U.S. Pat. No. 4,644,561, dated Feb. 17, 1987 and U.S. Pat. No. 4,675,863, dated Jun. 23, 1987. The technology disclosed in these patents provides base stations in communication with both a central office and a plurality of subscriber stations utilizing digital wireless time division circuits wherein there are repetitive sequential slot positions in a transmit channel bit stream, each slot being associated with a particular subscriber.

The base stations used in the above time division system are relatively complex and expensive but economically feasible for a large system serving a large number of subscribers; however, for relatively small systems serving a relatively small number of subscribers it may be economically infeasible. In addition, such a system utilizes a pair of frequencies, one for transmission and one for reception, and, in view of the limited amount of channels available in the spectrum, it would be highly advantageous if only one frequency could be effectively used.

It is, therefore, an object, of the present invention to provide what may be called a simulated or emulated base station which can be effectively substituted for an actual base station in certain situations.

Another object is to provide a system that can be utilized for plural subscribers but which is operable on only a single frequency.

Other objects will become apparent from the following description and claims:

SUMMARY OF THE INVENTION

In essence, the system of the present invention utilizes what is, in effect, a modified subscriber station to act as a simulated or emulated base station, thereby considerably decreasing the total cost and complexity of the system. This emulated base station essentially differs from the subscriber station only in being able to initiate the synchronization process, whereas the subscriber unit only acts to scan the RF signals sent out by the emulated base station until it finds the frequency and slot assigned to it. In the intervals between transmissions of the RF signals the emulated base station is adapted to receive RF signals from the subscriber units. In this manner, the subscriber unit may either talk to the emulated base station which then acts as another subscriber station, or it may talk to another subscriber station that has been synchronized therewith by the emulated base station.

DETAILED DESCRIPTION OF THE PREFERRED EMBODIMENTS

Figure 1:
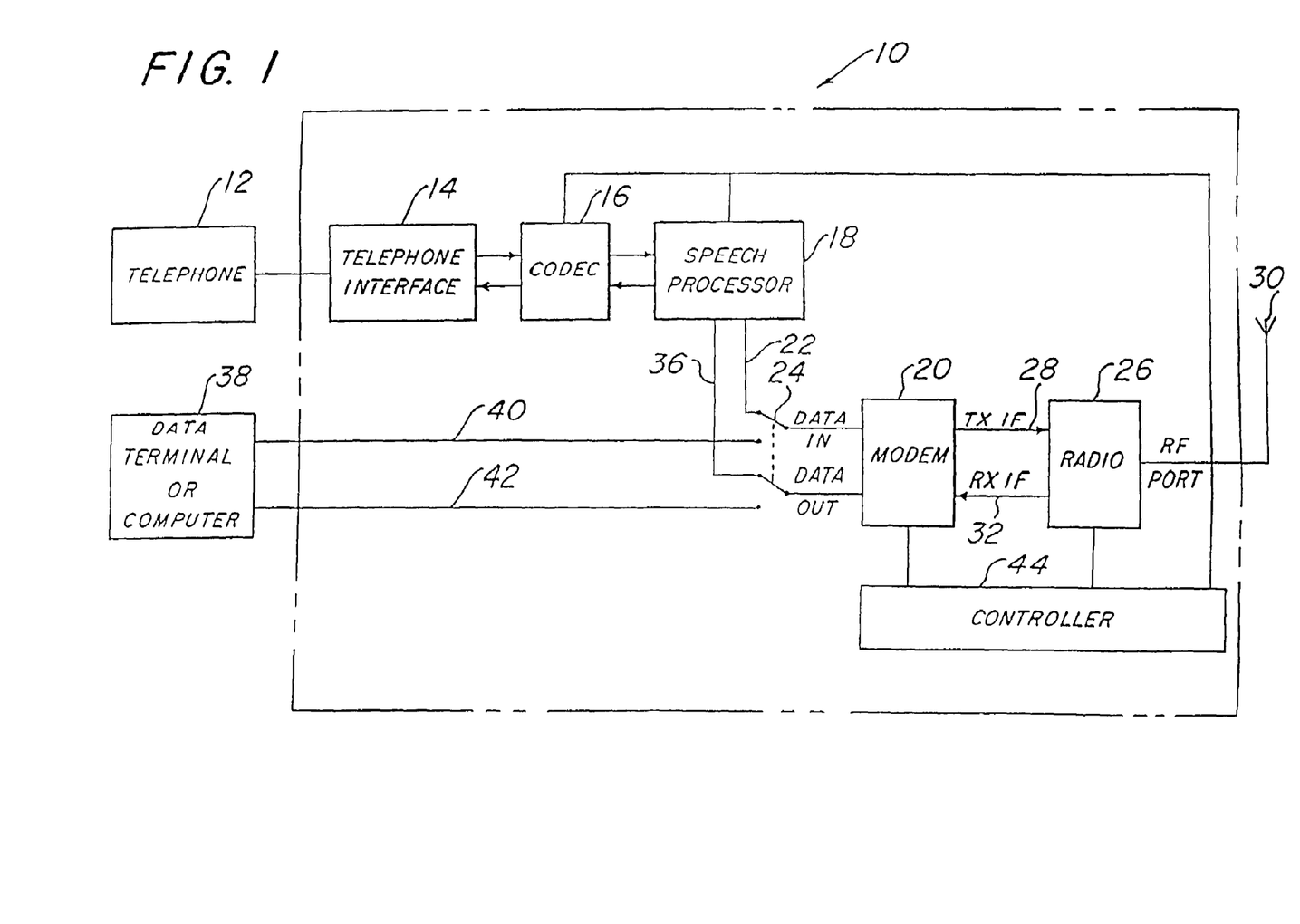
FIG. 1 is a block diagram showing an overall system embodying the present invention.

The overall internal operation of the system, generally designated 10, is shown in block diagram form in FIG. 1. In this system, during a telephone conversation, a person speaks into the telephone 12 and the speech signal is sent to the local telephone interface unit 14. The signal is digitized by the codec 16 and the resultant digital data stream is then fed to the speech processor 18 which compresses the speech data to a lower data rate. The compressed data is then fed to the modem 20 via line 22 and double-throw switch 24, the modem acting to convert the data stream to a spectrally efficient analog signal. This analog signal is fed to the radio 26 via line 28. The radio upconverts the signal to a radio frequency (RF) signal and then transmits this RF signal via the antenna 30.

In the intervals between transmissions of the RF signals, the unit is adapted to receive RF signals from a subscriber unit. The radio 26 downconverts each of these RF signals to an IF signal and feeds this IF signal to the modem 20 via line 32. The modem 20 demodulates the IF signal to form a digital signal which is then fed to the speech processor via switch 24 and line 36. The speech processor thereupon acts to expand the signal to a digitized speech signal and this digitized signal is then fed into the codec 16 which outputs an analog speech signal to the telephone 12 via the telephone interface 14.

The data transmission mode is similar to that described above except that the telephone is replaced by a data terminal or computer 38 and the telephone, codec and speech processor are bypassed by means of the alternate position of the switch 24 that is then coupled to the terminal 38 by lines 40 and 42.

The modem 20 and radio 26 are both coupled to a control unit 44. The control unit 44 includes selecting means 45, monitoring means 46 and assigning means 47. The control unit 44 is initially set to a predetermined slot, modulation and training mode for the modem and to a predetermined RF frequency and power level for the radio. However, these parameters can be adjusted by the subscriber unit in the event they are not adequate to provide a satisfactory reception at the subscriber station.

Figure 2:
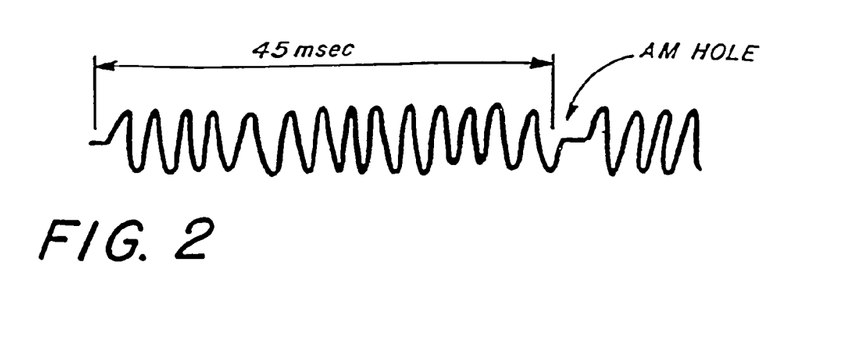
FIG. 2 is a diagramatic illustration of the RCC wave-form used in the standard base station.
Figure 3:
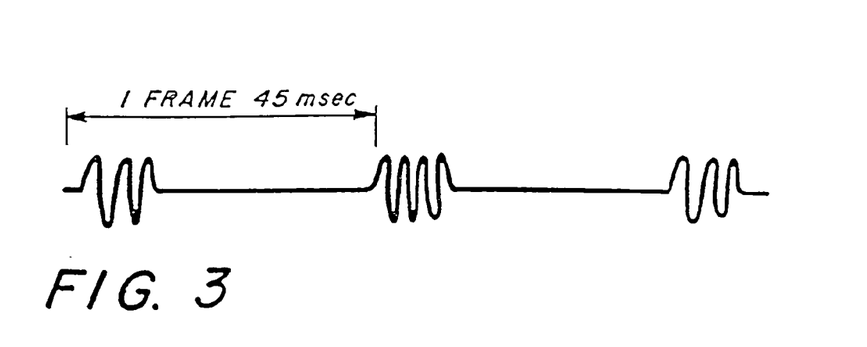
FIG. 3 is a diagramatic illustration of the RCC wave-form used in the present invention.

In a system utilizing an actual base station, such as, for example, the system described in the aforesaid U.S. Pat. No. 4,675,863, the transmitted waveform is divided into a multiplicity (i.e. 45) msec. frames. Each frame is, in turn, divided into four 11.25 msec. slots. The base station transmits on all four slots to produce a 100% duty cycle modulation waveform, the lone exception being the radio control channel (RCC). The RCC slot is slightly shorter than 11.25 msec and this causes a small gap in the modulation at the beginning of every frame. This gap is known as an AM hole. A diagram of the waveform of the RCC channel in the actual base station format is shown in FIG. 2. In the system of the present invention, however, there is no transmission of a 100% duty cycle waveform. Instead, there is a transmission on only one slot per frame (a 25% duty cycle waveform), as shown in FIG. 3. This modified frame format necessitates changes in coarse synchronization, automatic gain control (AGC) and frequency acquisition. These changes are indicated in the following description:

Coarse Synchronization

Figure 4:
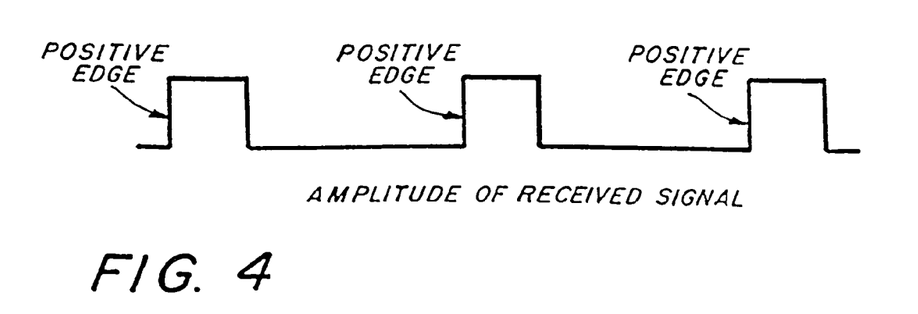
FIG. 4 is a diagramatic illustration showing the positive edges of the amplitude of the received signal used in course synchronization of the present invention.

Since the system of the present invention utilizes only a 25% duty cycle waveform, it monitors the amplitude of the received signal and searches for positive edges in the amplitude signal. These positive edges are illustrated in FIG. 4. The subscriber unit adjusts its frame timing to align with the occurrence of these positive edges.

Figures 5, 6:
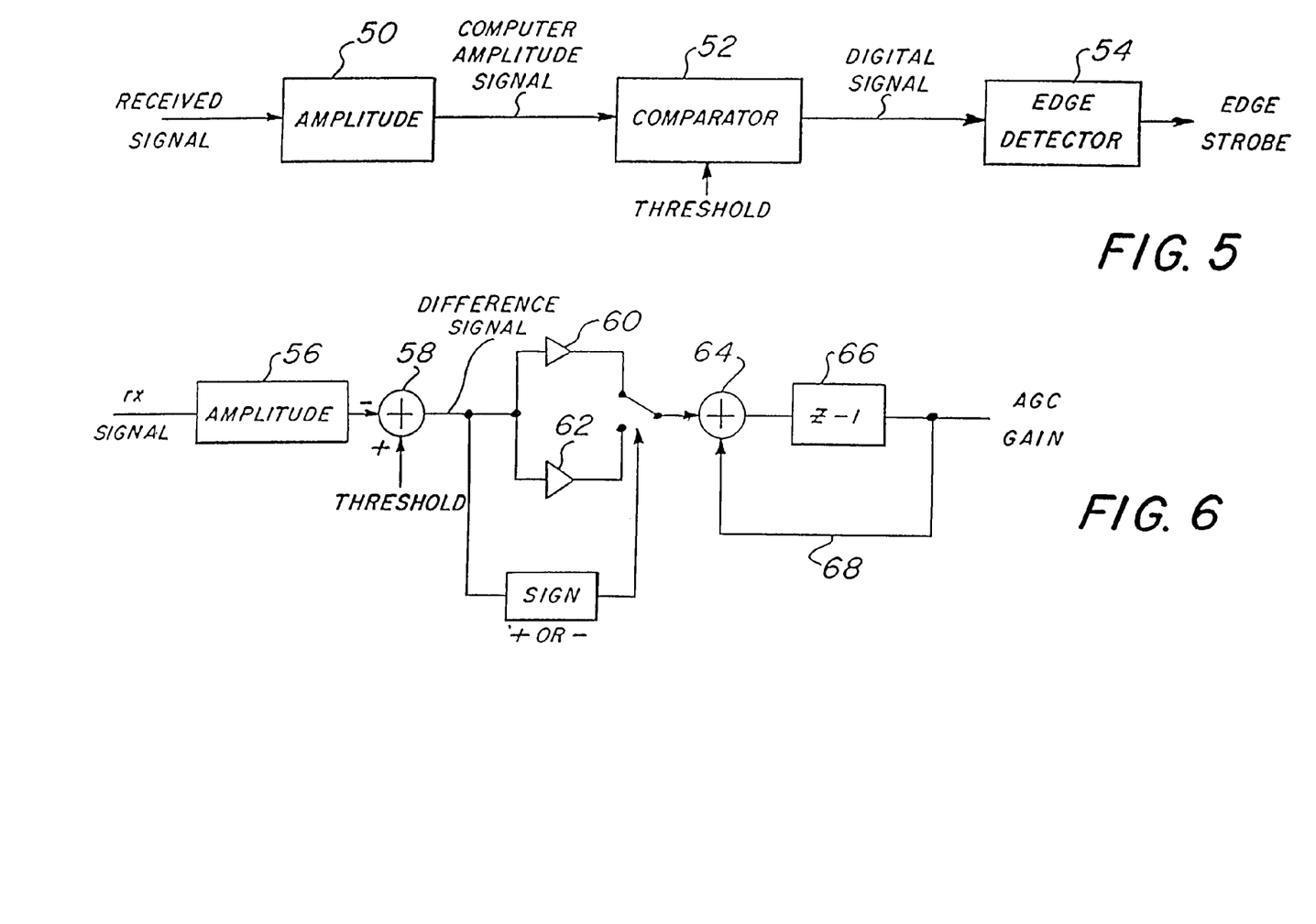
FIG. 5 is a block diagram of the circuit for obtaining course synchronization in the present invention.
FIG. 6 is a block diagram of the received AGC circuit used in the present invention.

The circuit for obtaining the above type of coarse synchronization is shown in block diagram form in FIG. 5 where the received signal is shown as being fed into an amplitude computation device 50 which produces a computer amplitude signal that is then passed to a comparator 52 where it is compared to a predetermined threshold signal, thereby forming a digital signal (1=signal present, 0=no signal present). This digital signal is fed into an edge detector 54 that outputs a strobe to indicate the detection of a positive edge.

AGC

The 25% duty cycle modulation requires a distinct type of receive AGC circuit which avoids tracking when there is no signal present. A slow rise fast decay AGC is, therefore, provided. This is shown in FIG. 6 where the received signal is fed into an amplitude computation device 56, which may take the form of a pre-programmed ROM, from which a resulting amplitude signal is fed into a comparator 58 in which it is subtracted from a predetermined threshold value to form a difference signal. This difference signal is fed through one of two scaling multipliers, shown at 60 and 62, into a low pass filter comprising an adder 64 and a delay means 66 connected through a loop 68. One or the other of the two multipliers is used in accordance with the sign of the difference signal. If the difference signal is positive, the slow decay in the AGC control signal is implemented. If the difference signal is negative, a fast rise in the AGC control signal is implemented. The output of the filter is the gain signal which is then fed to the gain control unit 44 shown in FIG. 1.

Coarse Frequency Acquisition

Figure 7:
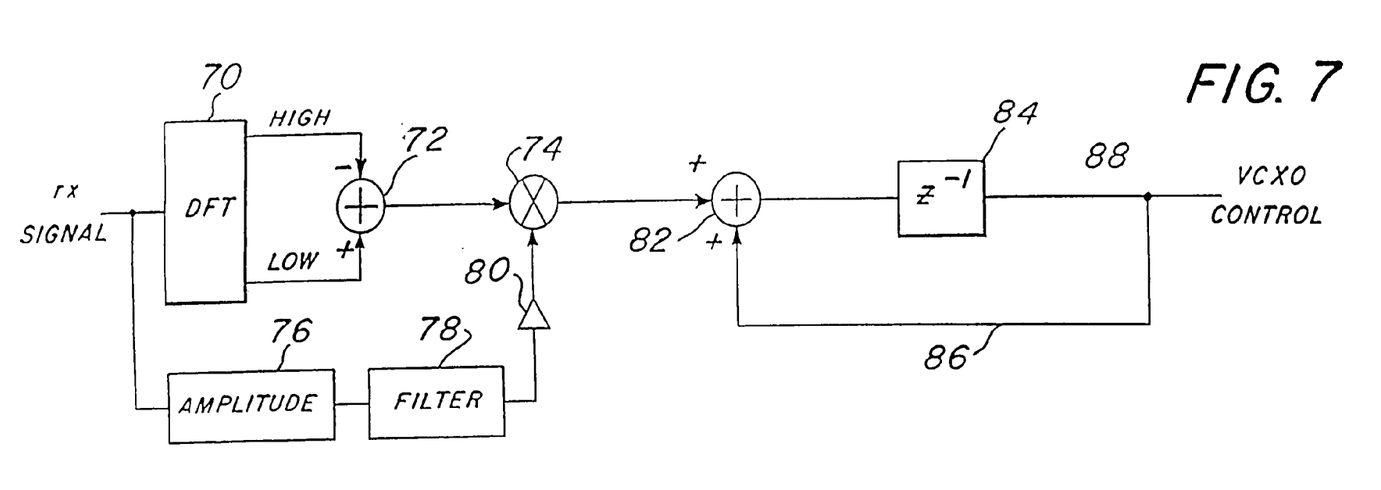
FIG. 7 is a block diagram showing the frequency acquisition circuit used in the present invention.

Since in the 25% duty cycle frame format it is not required to perform frequency acquisition during the off time (75% null time) and since the frame timing is not known at the time when frequency acquisition is performed, a modified form of frequency acquisition circuit has been provided, as shown in FIG. 7. In this circuit the received signal is fed into a Discrete Fourier Transform (DFT) computation device 70 which outputs the high band energy (energy in the frequency band above the center frequency) and the low band energy (energy in the frequency band below the center frequency). The high band energy output is subtracted from the low band energy output at the adder 72 and the output thereof is fed to a mixer or multiplier 74. The received RF signal is also passed to a stripping means 76 which strips off the sign of the signal (negative or positive), thereby determining only the amplitude of the signal. The stripped signal is then fed to a filter 78 which smooths the signal by averaging it out. The output from the filter 78 is fed, via amplifier 80, to the multiplier 74.

The primary purpose of the circuit through 76, 78, and 80 is to prevent the action of noise on the output signal while accentuating the signal itself. In this respect, since noise generally has a small amplitude it is effectively filtered out during the smoothing process. On the other hand since the actual signal generally has a relatively large amplitude it is, in effect, highlighted by adding the smoothed or filtered signal to the mixer 74.

The scaled signal leaving the mixer 74 is balanced between the high and low energy frequencies, and this balanced signal, that is proportional to the short term average amplitude of the received signal, is fed into a lowpass filter comprising an adder 82, and a delay means 84 which are looped at 86. The delay means 84 causes the output signal 88 to the VCXO control to represent the output immediately prior to the output actually fed into the lowpass filter. The VCXO control is used to adjust the frequency of the master oscillator in the system.

After initial or course synchronization has been effected, the system is in an idle voice mode but is fully set up for voice operation. If the phone at either end goes off-hook, the phone at the other end will ring until the ringing phone is answered or the initiating phone goes on-hook.

The calls are set up by a voice code word (VCW) at the beginning of every voice slot, this code word indicating an off-hook condition at the initiating station. When this occurs, the station acting as an emulated base station then appears to itself go off-hook to the central office (CO) thereby making a connection to the central office. The initiating subscriber station then proceeds to complete the call by dialing the desired number. When the initiating subscriber unit goes on-hook, the emulated base station is so informed by the VCW and presents an on-hook appearance to the central office.

When the emulated base station detects a ring signal from the central office, the subscriber unit is caused to ring by means of the corresponding VCW from the emulated base station. When the subscriber unit thereafter goes off-hook, the emulated base station is so informed via the corresponding VCW and it then presents an off-hook appearance to the central office.

Figure 8:
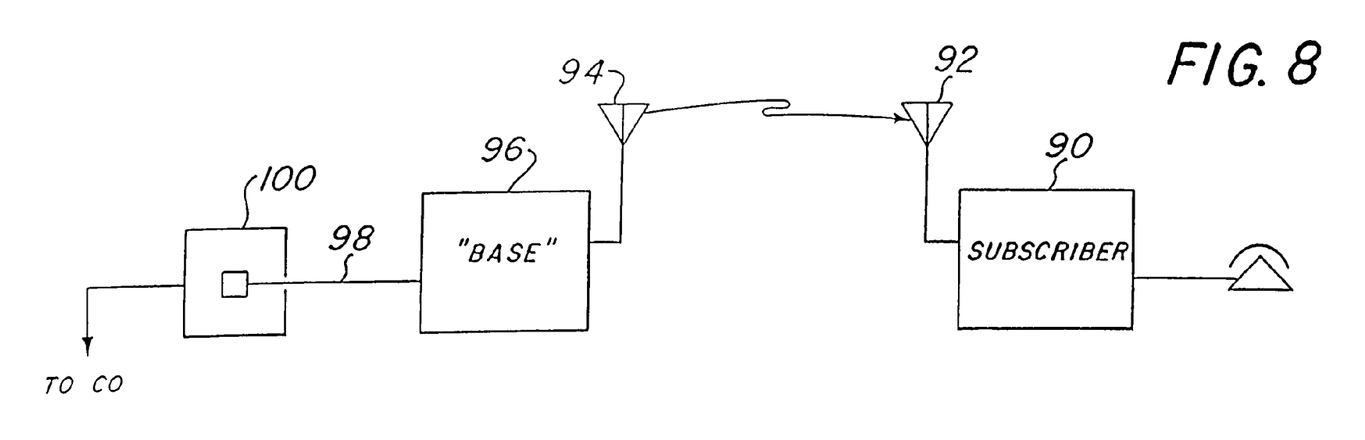
FIG. 8 is a diagramatic illustration of a wireless's phone system configuration embodying the present invention.

The above type of wireless phone system configuration is exemplified in FIG. 8 where the subscriber unit 90 is shown in wireless communication via antennas 92 and 94 with the emulated base station 96. The station 96 is in wireline communication via line 98 and interface 100 with the central office.

Dual Subscriber System

Figure 9:
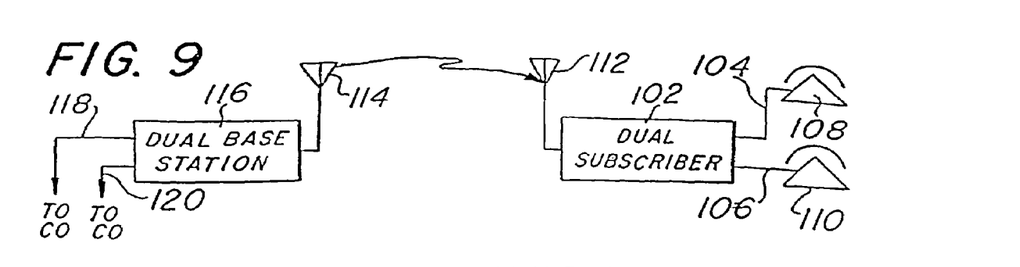
FIG. 9 is a diagramatic illustration similar to FIG. 8 but showing a dual subscriber system.

The above-described system can be employed with a dual subscriber arrangement as shown in FIG. 9. In this system each channel is capable of supporting two complete conversations without the necessity of using a duplexer. In this respect, a dual subscriber unit 102 is connected by wires 104 and 106 to a pair of subscriber telephone sets 108 and 110. The subscriber unit 102 is in wireless communication via antennas 112 and 114 with an emulated dual base station 116. The unit 116 is connected to the central office by wire lines 118 and 120.

Figure 10:
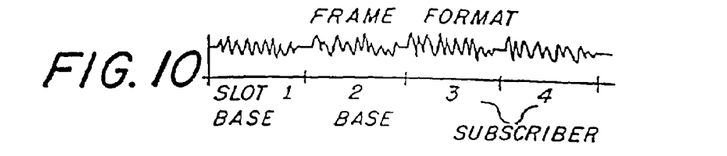
FIG. 10 is a diagramatic illustration of the frame format of the dual subscriber system of FIG. 9.

The two separate subscribers 108 and 110 utilize a time slot arrangement, such as disclosed in the aforesaid U.S. Pat. No. 4,675,863, wherein each subscriber is assigned a separate slot. The frame format for this arrangement is shown in FIG. 10 where four slots are shown, numbered 1, 2, 3 and 4. the first two slots are used for the emulated base station and the last two are used for the two subscribers.

Figure 11:
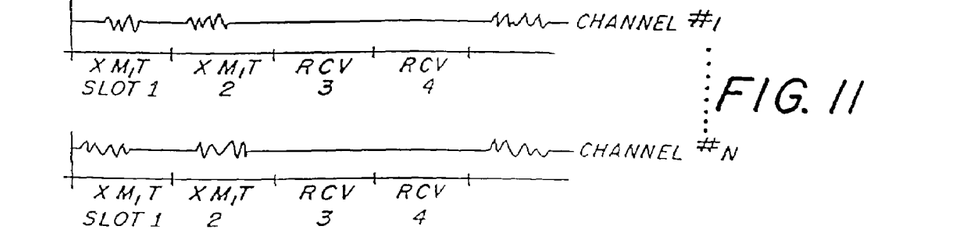
FIG. 11 is a diagramatic illustration of the frame format of a plurality of dual subscriber systems.

A plurality of dual subscriber systems may be operated on different channels without duplexers by synchronizing all of the emulated base station transmissions. This is illustrated by the frame format shown in FIG. 11 where channel 1 is shown above and channel n (indicating any desired number of channels in between) is shown below. On each channel, the first two slots are for transmission and the last two are for reception.

Paged Remote Service

One emulated base station may be used with a plurality of different subscribers, one at a time. In such arrangement, for reception, the subscribers continuously monitor the transmissions of the radio control channels (RCC), described more fully in the aforesaid U.S. Pat. No. 4,675,863, until a particular subscriber is paged by the emulated base station by means of the subscriber's ID Number (SID). After receiving a page, the subscriber initiates a transmission back to the emulated base station using the synchronization process described above. For initiating a call, the subscriber transmits on the RCC using the previously described synchronization process.

Monitoring Function

Figure 12:
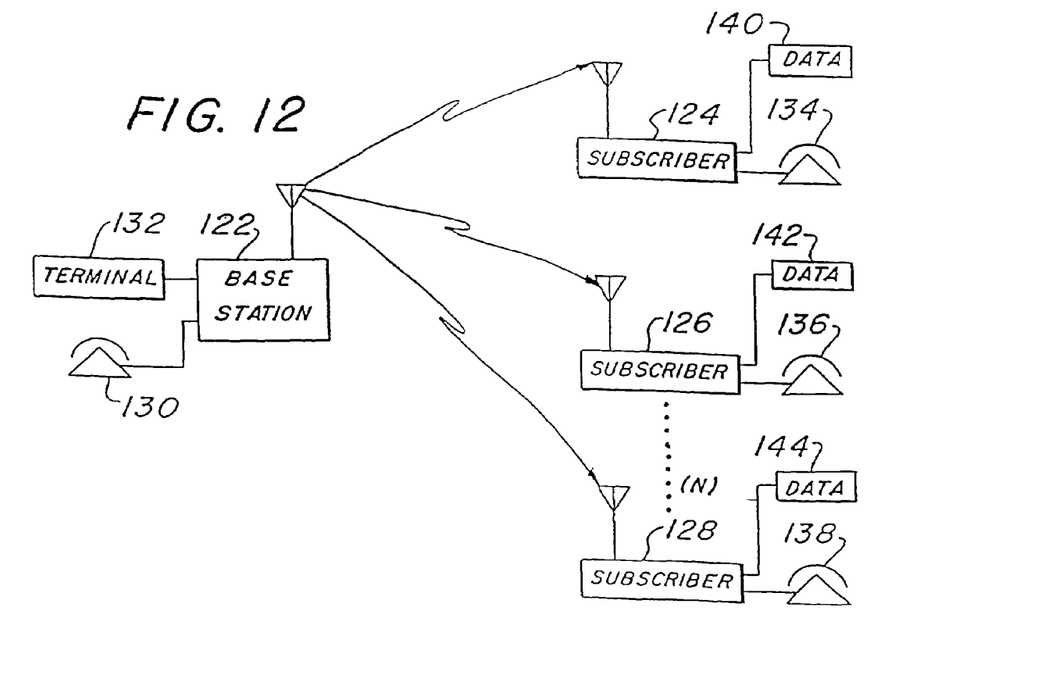
FIG. 12 is a diagramtic illustration of a system embodying the present invention which is used for monitoring one or more functions.

The present system may be used for monitoring one or more functions. In this respect, using a computer as a controlling/data logging device, a plurality of subscribers may be periodically polled to report on some function such as temperature, weather conditions, security, water/flood warnings, low fuel warnings, remote gas, electric or water meter readings, etc. This is illustrated in FIG. 12 where an emulated base station 122 is in wireless communication with a plurality of subscriber units respectively designated 124, 126 and 128. The unit 122 is in wire line connection with both a telephone 130 for voice communication and a computer or data terminal 132 for data input. Similarly, each subscriber unit is connected both to a respective telephone 134, 136 or 138 for voice communication and to a data device, as at 140, 142 or 144 respectively.

Repeater System

Figure 13:
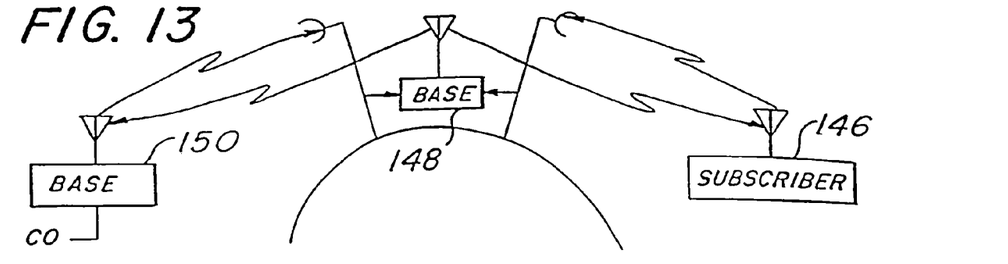
FIG. 13 is a diagramatic illustration of a repeater system embodying the present invention.

An important use of the present system is as a repeater to extend the range of the system. In this arrangement, the emulated base station may be used to overcome interfering obstacles such as mountains and the like. FIG. 13 illustrates this function, showing a subscriber unit 146 in wireless communication with an emulated base station 148 on the summit of a mountain. The unit 148 is also in wireless communication with a standard base station 150 connected to a central office.

Figure 14:
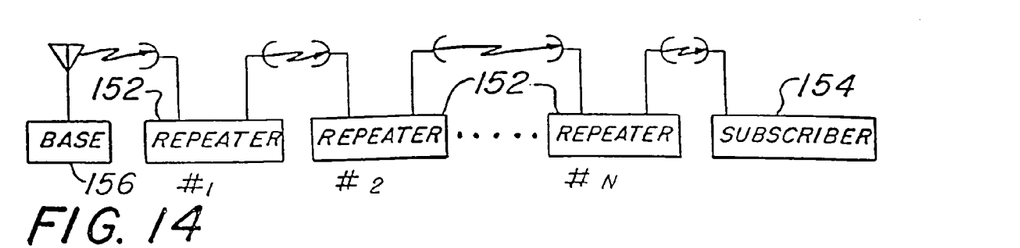
FIG. 14 is a diagramatic illustration of a system embodying the present invention utilizing multiple repeaters.

The relative simplicity and inexpensiveness of the emulated base station makes it very cost effective as a repeater unit. It can also be used as a repeater to extend the long distance range of the system regardless of the presence or absence of obstructions. By utilization of the time slot arrangement, the repeater unit, without the use of any duplexer, fits into the complete system while remaining transparent to both the standard base station and the subscriber. It can, of course, also be interposed between the subscriber and another emulated base station instead of a standard base station. This can be provided in multiple stages from one emulated base station to another to greatly increase the range of the system in a relatively inexpensive manner. This is illustrated in FIG. 14 where a series of repeater units 152 are interposed between the subscriber 154 and the base station 156.

In addition to extending the range of the system, the repeater unit serves to clean up the actual base station signal via equalization before retransmission to the subscriber.

Figure 15:
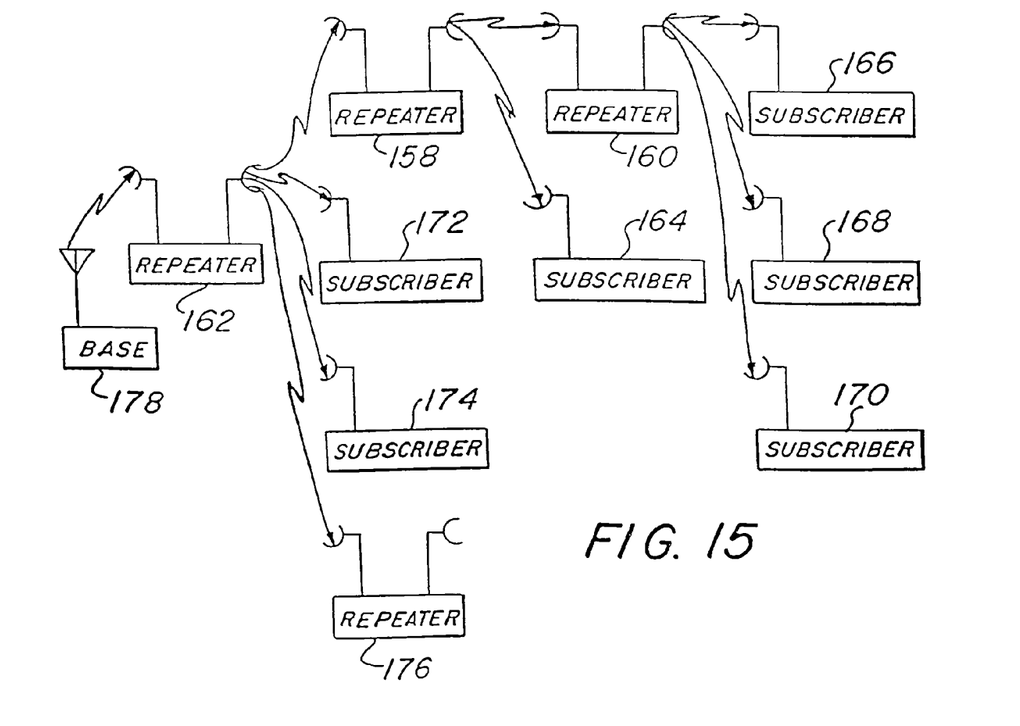
FIG. 15 is a diagramatic illustration of a system embodying the present invention where a single repeter is used to drive a plurality of other repeaters as well as subscriber units.

One repeater can also be used in what may be termed a repeater star system to drive multiple repeaters and/or subscribers. This is illustrated in FIG. 15 where the single repeater unit 158 is in wireless communication with ancillary repeaters 160 and 162 as well as with one or more subscribers such as at 164. The ancillary repeaters are themselves in wireless communication with subscribers such as shown at 166, 168, 170, 172 and 174 as well as with other ancillary repeaters such as at 176. Any one of the ancillary repeaters, such as repeater 162, may be used as the final repeater in direct communication with the base station indicated at 178.

Multiple repeaters may be placed at one location, on different channels and synchronized so that their transmissions and receptions occur simultaneously, thereby avoiding the use of duplexers. In such a configuration, a master repeater is used to monitor the RCC channel of the base station and relays the monitored information to the various subscribers via the emulated base station's RCC. In such a configuration, on call setup, the subscribers are each assigned a repeater channel.

The invention claimed is:

1. A telecommunication system using wireless transmissions, the system comprising:
   a primary station communicating with a first plurality of stations, the primary station including a radio having a receiver and a transmitter wherein:
   (i) said transmitter transmits primary station synchronization information including an assignment of n transmission fixed periodic time slots to a plurality of subscriber units of the first plurality of stations, where n is an integer greater than 1, and n reception fixed periodic time slots on a selected frequency, said assignment of time slots resulting in each of said plurality of subscriber units assigned a separable slot;
(ii) said radio transceives a duplex telephonic communication with the first plurality of subscriber units on the selected frequency wherein:
(a) said transmitter transmits first speech information in a respective one of the n transmission time slots on the selected frequency; and
(b) said receiver receives second speech information from each of the first plurality of subscriber units in one of the n reception time slots on the selected frequency and receiving base station synchronization information from a base station, wherein a transmit and receive timing of the primary station is synchronized to the base station using the base station synchronization information; and the first plurality of stations including:
the base station communicating with a second plurality of stations, the base station receiving from the primary station the first speech information originated from one of the first plurality of stations in said respective transmission time slot and transmitting the second speech information in said respective reception time slot, the base station transmitting the base station synchronization information; and
each of the subscriber units having:
(i) a radio receiver which receives the primary station synchronization information from the primary station and identifies the assignment of time slots and which receives from the primary station the first speech information originating from the base station in said respective transmission time slot, wherein a transmit and receive timing of the secondary station is synchronized to the primary station using the primary station synchronization information; and
(ii) a radio transmitter which transmits the second speech information in said respective reception time slot; and
(iii) each of said plurality of subscriber units finds the transmissions and slots assigned to that subscriber unit;
wherein using the primary station for transmissions between the base station and subscriber units is transparent to the base station and subscriber units, and the primary station and the subscriber units themselves detect a frame timing from received signals and aligns its transmitting frame timing accordingly.

2. A telecommunication system according to claim 1 wherein said primary station radio transmits an assignment of two transmission and two reception time slots.

3. A telecommunication system according to claim 1 wherein the subscriber units are positioned outside an operating range of said base station at a remote location whereat direct communication with said base station can not be made.

4. A telecommunication system according to claim 1 wherein the secondary station is one of a plurality of secondary stations and the primary station communicates between each of the plurality of secondary stations and the base station using a plurality of available frequencies including the selected frequency.

5. A telecommunication system according to claim 4 wherein each available frequency has a same time slot format and time synchronization as the selected frequency.

6. A telecommunication system according to claim 1 wherein the primary station.

7. A telecommunication system according to claim 1 wherein the secondary station is capable of receiving the base station synchronization information and synchronizing to the base station.

8. A telecommunication station for communicating with a base station and a secondary station using wireless transmissions, the base station communicating with a plurality of stations, the telecommunication station comprising:
a transmitter which:
(i) transmits telecommunication station synchronization information including the assignment of 2n fixed periodic time slots to a plurality of subscriber units including the secondary station, where n is an integer greater than 1, on a selected frequency, n fixed periodic transmit time slots for transmission from said telecommunication station and n fixed periodic reception time slots for reception by said telecommunication station, the telecommunication station synchronization information enabling a transmit and receive timing of the secondary station to be synchronized to the telecommunication station, said assignment of time slots resulting in each of said plurality of subscriber units assigned a separable slot; and
(ii) transmits TX information to the base station and the secondary station on the selected frequency in respective ones of said n assigned transmit slots, the receiver receiving base station synchronization information to synchronize a transmit and reception timing of the telecommunication station to the base station; and
a receiver which receives RX information from the base station and the secondary station on the selected frequency in respective ones of said n assigned reception slots and receives synchronization information from the base station, the receiver receiving base station synchronization information to synchronize a transmit and reception timing of the telecommunication station to the base station
wherein using the telecommunication station for communications between the base station and secondary station is transparent to the base station and secondary station, and the telecommunication station and the secondary station itself detects a frame timing from received signals and aligns its transmitting frame timing accordingly; and
each of said plurality of secondary stations finds the transmissions and slots assigned to that secondary station.

9. A telecommunication system comprising the telecommunication station of claim 8 and a secondary station which includes:
(i) a secondary station receiver which receives the synchronization information from said telecommunication station, identifies the assignment of time slots on said selected frequency, and receives the TX information on the selected frequency in a respective one of said assigned transmit slots; and
(ii) a secondary station transmitter which transmits a signal carrying the corresponding RX information of m duplex telephonic communications on the selected frequency in m of said assigned reception slots.

10. A telecommunication station according to claim 8 wherein the secondary station is a subscriber unit which is positioned outside a communicating range of said base station at a remote location whereat direct communication with said base station can not be made.

11. A telecommunication station according to claim 8 wherein said transmitter and receiver are embodied in a radio.

12. A telecommunication station according to claim 8 wherein the secondary station is one of a plurality of secondary stations and the telecommunication station communicates between each of the plurality of secondary stations and the base station using a plurality of available frequencies including the selected frequency.

13. A telecommunication station according to claim 12 wherein each available frequency has a same time slot format and time synchronization as the selected frequency.

14. A telecommunication station according to claim 8 wherein the telecommunication station equalizes base station communications prior to retransmission to the secondary station.

15. A telecommunication station for communicating with a base station and a secondary station using wireless transmissions, the base station communicating with a plurality of stations, the telecommunication station comprising:
   a transmitter which:
      (i) transmits telecommunication station synchronization information including the assignment of fixed periodic time slots to a plurality of subscriber units including the secondary station on a selected frequency, at least two fixed periodic transmit time slots for transmission from said telecommunication station and at least two fixed periodic reception time slots for reception by said telecommunication station, wherein the telecommunication station synchronization information enables a transmit and receive timing of the secondary station to be synchronized to the telecommunication station, said assignment of time slots resulting in each of said plurality of subscriber units assigned a separable slot; and
      (ii) transmits a signal carrying information received from the base station on the selected frequency in a first assigned transmit slot and carrying information received from the secondary station on the selected frequency in a second assigned transmit slot; and
   a receiver which:
      (i) receives the information transmitted from the base station on the selected frequency in a first assigned reception slot and base station synchronization information from the base station, wherein a timing of the secondary station is synchronized to the telecommunication station using the telecommunication station synchronization information; and
      (ii) receives the information transmitted from the secondary station on the selected frequency in a second assigned reception slot; and
      (iii) each of said plurality of subscriber units finds the transmissions and slots assigned to that subscriber unit;
   wherein using the telecommunication station for communications between the base station and secondary station is transparent to the base station and secondary station, and the telecommunication station and the secondary station itself detects a frame timing from received signals and aligns its transmitting frame timing accordingly.

16. A telecommunication station according to claim 15 wherein the secondary station is positioned outside a communicating range of said base station at a remote location whereat direct communication with said base station can not be made.

17. A telecommunication station according to claim 15 wherein said transmitter and receiver are embodied in a radio.

18. A telecommunication station according to claim 15 wherein:
   the secondary station is one of a plurality of secondary stations and the telecommunication station communicates between each of the plurality of secondary stations and the base station using a plurality of available frequencies including the selected frequency; and
   each available frequency has a same time slot and time synchronization as the selected frequency.

19. A telecommunication station according to claim 15 wherein the telecommunication station equalizes base station communications prior to retransmission to the secondary station.

* * * * *

UNITED STATES PATENT AND TRADEMARK OFFICE
CERTIFICATE OF CORRECTION

PATENT NO. : 7,106,819 B1
APPLICATION NO. : 09/356845
DATED : September 12, 2006
INVENTOR(S) : Kaewell, Jr. et al.

It is certified that error appears in the above-identified patent and that said Letters Patent is hereby corrected as shown below:

At sheet 1, FIG. 1, at item "44", add --SELECTING MEANS, MONITORING MEANS & ASSIGNING MEANS-- to item 44.

At column 2, line 43, after the word "single", delete "repeter" and insert therefor --repeater--.

At column 4, line 38, before the word "since", delete "hard" and insert therefor --hand--.

At column 5, before the word "first", delete "the" and insert therefor --The--.

Signed and Sealed this

Seventeenth Day of April, 2007

JON W. DUDAS
*Director of the United States Patent and Trademark Office*